United States Patent [19]
Payton

[11] 3,760,446
[45] Sept. 25, 1973

[54] GAS CURTAIN VENTILATION CONTROL FOR OPEN HOODED FERROALLOY FURNACE

[75] Inventor: Richard N. Payton, Youngstown, N.Y.

[73] Assignee: Airco, Inc., New York, N.Y.

[22] Filed: Apr. 11, 1972

[21] Appl. No.: 242,985

[52] U.S. Cl............................. 13/9, 98/36, 263/50
[51] Int. Cl....................... F27d 17/00, H05b 7/00
[58] Field of Search.................. 13/9; 263/50; 98/36

[56] References Cited
UNITED STATES PATENTS
3,396,954  8/1968  Krogsrud............................. 13/9 X Primary Examiner—Roy N. Envall, Jr.
Attorney—Larry R. Cassett et al.

[57] ABSTRACT

An open electric smelting furnace system including an open top electric furnace, a hood above the furnace pot for collecting gaseous furnace products containing entrained solid particles and induced air derived from the atmosphere surrounding the furnace and admitted through the unobstructed access zone above the furnace, a solid particle collection system of limited volumetric capacity connected to the collecting hood, for cleaning the gaseous products prior to discharge into atmosphere, and means for projecting a curtain of gas partially across the unobstructed access area between the furnace pot top and hood to thereby minimize the volume of air induced into the hood from surrounding atmosphere to an amount sufficient to effect substantially complete combustion while simultaneously maintaining the flow and temperature at the collecting system below preselected limits and maintaining the volumetric flow below the allowable limit.

7 Claims, 4 Drawing Figures

GAS CURTAIN VENTILATION CONTROL FOR OPEN HOODED FERROALLOY FURNACE

BACKGROUND OF INVENTION

This invention relates generally to electric furnace apparatus and methodology, and more specifically, relates to openhooded ferroalloy furnaces and to methods and apparatus for reducing the costs of air pollution equipment utilized in conjunction with such furnaces.

The so-called openhooded ferroalloy furnaces have been used extensively within recent years in metalurgical processes involved in the melting and smelting of ferroalloys and similar metallic substances. The cited furnaces are characterized by an open lower furnace pot and a hood which is spaced above the furnace for collecting the gaseous products emanating, in the case of smelting furnaces, from the combustion zone between hood and melt contained in the underlying pot. The arrangement indicated is particularly advantageous in that a large scale unobstructed access zone is provided between the furnace pot and overlying hood so as to enable observation, charging, and/or stoking of the furnace. This unobstructed access opening also serves to admit ambient air for air combustion of carbon monoxide from the smelting operations or to ventilate dust and fumes from melting operations. In either case, there must be adequate ventilation of dust from the furnace hood and pot into the dust collection system without loss of same to the atmosphere surrounding the furnace proper.

Within the last several years, the increasing need for air pollution control has heightened the demand for more efficient collection of dust and fumes emanating from furnaces of the foregoing type during their operation. The collection systems utilized for these antipollution purposes, for economic reasons, should have a limited flow capacity, in order to minimize the capital and operating costs of the equipment. Normally, the cost of such dust collection systems rises in proportion to the volume of output gases which must be treated per unit time. Accordingly, any methods or furnace modifications which would limit the flow output of gases from the electric open furnaces of the types treated herein, while preserving the operating parameters described above, would constitute a valuable cost-saving improvement.

In an attempt to solve the foregoing problem, it has in the past been proposed that mechanical doors be used at the access zone atop the furnace pot so as to produce a valving of the ambient airflow into the said zone. However, such doors have the following disadvantages: (1) they must be operated frequently in order to stoke the furnace; (2) they do not easily allow the addition of dirty gases as make-up-air; (3) they obstruct the view and thus the control of the furnace by the operator; and (4) they are mechanically subject to wear, must be adequately cooled or protected from the radiant heat, and as such, are unduly expensive to build and maintain.

In accordance with the foregoing, it may be regarded as an object of the present invention to provide method and apparatus enabling reduction of the costs of air-pollution equipment by reducing the amount of ambient air consumed in the ventilation of openhooded ferroalloy furnaces, without however, reducing the unobstructed access zone present in the said furnace.

It is a further object of the present invention to provide method and apparatus enabling reduction of the gaseous output volume from openhooded ferroalloy furnaces, wherein still greater reduction in ventilation and collection costs are achieved by recycling all, or portions of, the dirty gases generated from the ancillary furnace operations, such as tapping, casting of molten metal, ladle reactions, and the like, in said furnace areas.

SUMMARY OF INVENTION

In accordance with the present invention, the foregoing objects, and others as will become apparent in the course of the ensuing specification, are achieved in electric smelting and melting furnace systems which include an electric furnace pot, and an overlying hood spaced from the furnace for collecting the hot gaseous furnace products containing entrained solid particulate and induced air dust where derived from the atmosphere surrounding the furnace and admitted through the unobstructed access zone between furnace pot and hood. A particulate collection system of minimal flow capacity is connected to the output from the hood and acts to separate the particulate component from the hot gaseous products, the latter being subsequently discharged to atmosphere. Means for projecting a curtain of gas partially across the unobstructed access area between the furnace and hood are provided to thereby contain the gases and particulate components within the furnace hood while limiting the ventilating and combustion air into the hood.

The pattern and flow of ambient air is controlled to establish the following boundary conditions: (1) that complete combustion of the furnace gases emanating from smelting operations will occur, and that heat and dust from furnace melting operations are removed; (2) the temperature of the gases reaching the collection system is maintained below preselected values; and (3) the volume of gases processed through the collection system is maintained below the capacity of the collection system. The medium used for the gas curtain addition may include any of the following, in addition to ambient air: furnace tapping fumes, ladle reaction fumes, slag or molten metal fumes, and molten alloy casting bed fumes.

The advantages of this invention apply equally well to all of the conventional types of dust collection apparatus, namely: dry electrostatic precipitators, baghouse fabric collectors, and various types of wet scrubbers. The precipitators on ferrochrome silicon furnaces, charge chrome and others, frequently require conditioning of the gas by means of humidification; this is most easily accomplished from a high temperature level. Baghouse collectors can accept temperatures in the vicinity of 500° F, and can use coolers, if necessary, to reach this temperature. Wet scrubbers can handle hot gases at virtually any temperature.

BRIEF DESCRIPTION OF DRAWINGS

The invention is diagrammatically illustrated by way of example in the drawings appended hereto in which.

DESCRIPTION OF PREFERRED EMBODIMENT

Figure 1:
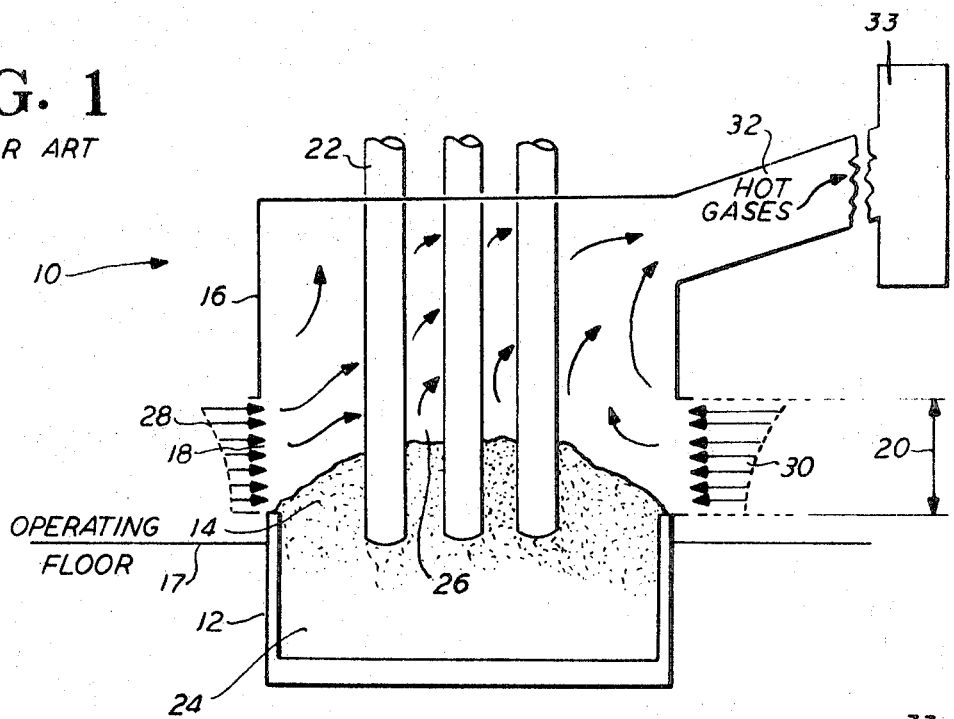
FIG. 1 is a schematic, longitudinal cross-section of a prior art openhooded ferroalloy furnace provided with the usual ventilation features.

In FIG. 1, a prior art openhooded ferroalloy furnace is shown by way of longitudinal and highly schematic cross-section. As seen therein, the furnace, generally designated at 10, includes a furnace pot 12, which is open at the top end 14 thereof and spaced from an overlying furnace hood 16. The top 14 of the furnace lies at a level accessible to the operating floor 17 so that personnel may readily charge and stoke the said furnace through an access zone 18 provided between furnace hood 16 and pot 12. Typically, the charging and stoking space, represented by the dimension 20, is of the range of 6 to 8 feet. Electrodes 22 extend into the furnace charge 24, and in accordance with known principles, heat the charge to reaction temperatures. The reduction gases arise from the melted charge and enter the combustion zone generally designated at 26 adjacent to the melt. In such zone, the reduction gases are mixed with ambient combustion gas, that is, air, which enters into zone 26 through the access zone 18, which is annular in form. The average face velocity of ambient air pouring into the zone 26 is suggested by the schematic profiles at 28 and 30, where the horizontal length of the arrows is proportional to the velocity of flow at the point of the individual arrows. It may in this connection, be noted that the average face velocities at the right of the FIG. 1 are higher than those at the left because of the specific construction shown, according to which the gas take-off from the overlying hood 16 is through an offtake duct 32 and into a solid particle collection system 33 at the right side of the said Figure.

Figure 2:
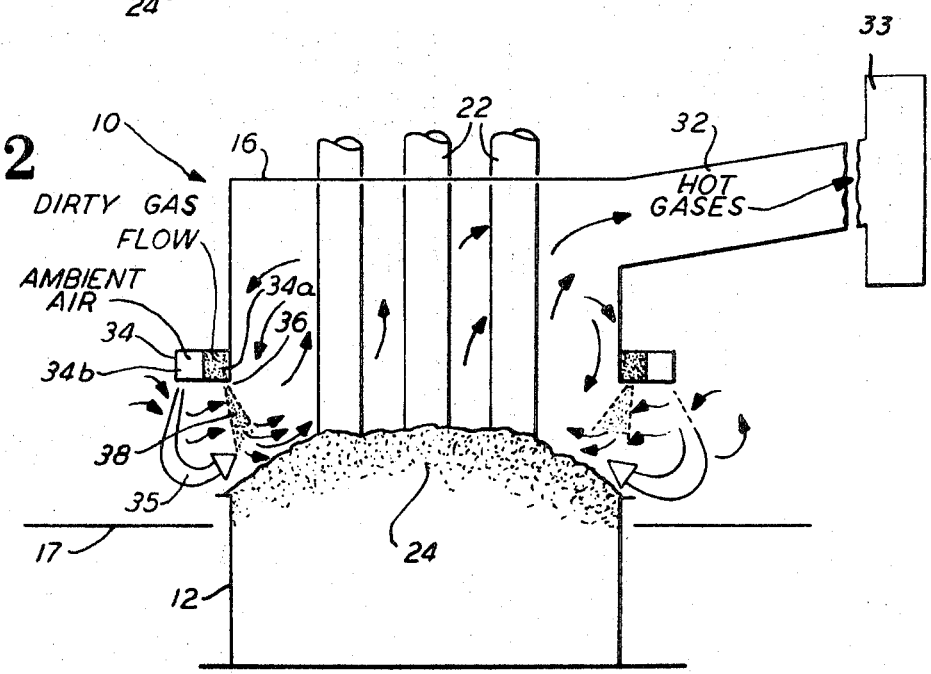
FIG. 2 and 2A are, respectively, schematic cross-sectional and top plan views of an openhooded ferroalloy furnace incorporating a gas curtain arrangement in accordance with the present invention.
Figure 2A:
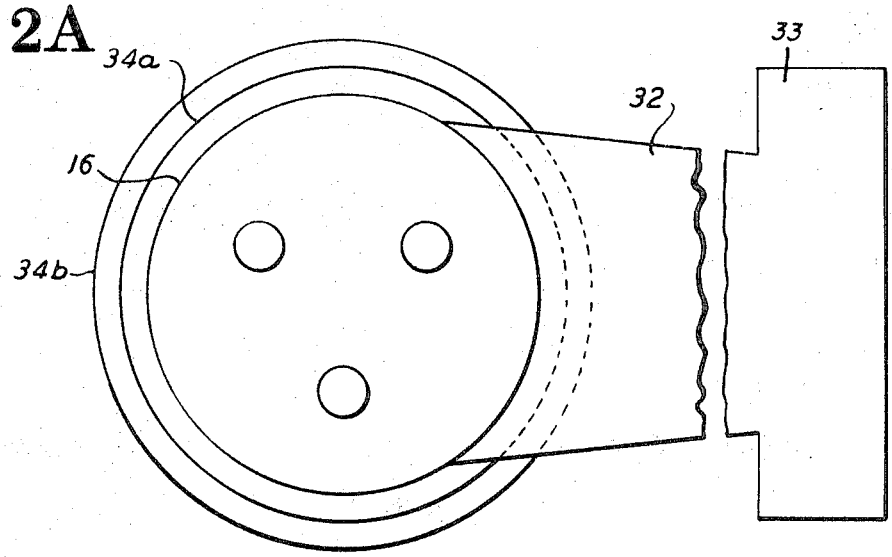

In FIG. 2 herein, a schematic cross-sectional view appears wherein a furnace similar to that set forth inn FIG. 1, is modified by inclusion of air curtain means provided in accordance with the purposes of the present invention. The furnace set forth differs from that of FIG. 1 in that an air curtain means generally designated at 34 is now provided about the periphery of the lower end 36 of hood 16. As is best seen in the top plan view of FIG. 2A, the means 34 extends in annular fashion about the hood 16. Means 34, used to establish the air curtain, is per se a conventional device which may include generally a plenum chamber and adjustable vanes extending about the bottom of the chamber and appropriately positioned to provide a knifelike curtain of air from the pressurized chamber. By proper design of the duct 34, the velocities and flows of a curtain may be obtained at points around the annular plenum. Similarly, a series of individual airjets may be provided at the lower side of the plenum chamber to provide a desired air curtain, a type of arrangement shown for example in U. S. Pat. No. 3,396,954.

In order to render the present discussion general in form, it will be noted that means 34 actually comprises an inner duct 34a and an outer duct 34b. The duct 34a is utilized in accordance with the principles of the invention to provide a curtain of air or gas, which may operate from furnace tapping, ladle handling or other sources of furnace fume and dust generation. For the latter purposes, a fan, hoods and dust system may be used to gather the said fumes or dusts, which, when not collecting fumes will collect clean air into its system. It is sometimes desirable to use a secondary flow of clean building air supplied through duct system 34b in applications where excessive drafts due to the building openings can disrupt the furnace hood ventilation. The direction, velocities and flow of such secondary air curtain 35 will be controlled by dampers, adjustable vanes and the like, and will have a separate supply fan and duct system as distinguished from the system of 34a described above. It shall be noted that the secondary dust system is not required if the furnace is located in a fully enclosed and non-drafty building.

Figure 3:
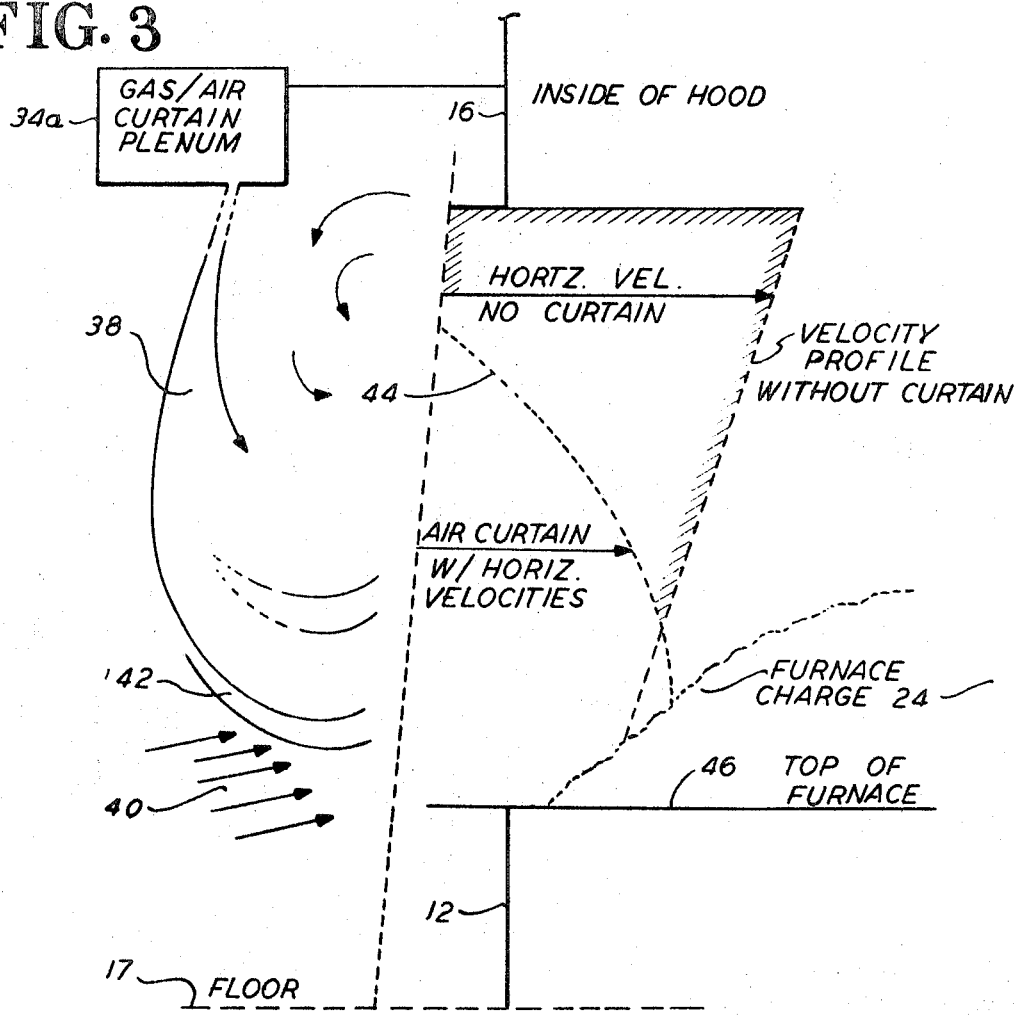
FIG. 3 is a schematic and graphical depiction, setting forth velocity profiles of face velocities for openhooded furnaces provided with and without air curtains in accordance with the invention.

A better understanding of the principles of the invention may now be gained by examination of FIG. 3 setting forth in schematic and graphical fashion velocity profiles of face velocities at the access zone 18 of openhooded furnaces provided with and without the curtain flow features of the invention. The showing of the Figure is predicted on the assumption that only a single ambient air gas duct such as at 34a is utilized, that is to say, the showing does not treat the modification wherein a secondary curtain of clean air flow is established. As thus seen in the Figure, a curtain 38 is established from duct 34a, the pattern of which curves about toward its lower end in such fashion as to not actually close the zone 18 against ambient air. Ambient air, accordingly does, in fact, enter into the combustion zone 26 as is suggested by the arrows at 40 beneath the edge 42 of curtain 38. Examination of the velocity profile for the curtain as shown at 44, will thus establish that there is virtually no inflow under the hood with the curtain in operation, with an increasing hood velocity inflow just above the top of the furnace charge. Clearly by increasing curtain flow rates, one may reduce the inflow of ambient air into the furnace, thereby controlling the flow of ambient air to the combustion zone. As an incidental but important benefit, it may be further noted that non-uniform face velocities, existing due to the presence of one or more outlets, as discussed in connection with FIG. 1, are made much more uniform by the present application of the air curtain. A second incidental benefit is mixing of ambient air entering the hood, with dusty furnace gases within the hood before the mixture leaves the hood offtake duct 32 and into a solid particle collection system 33. This will tend to avoid stratification of hot and cold gas in the ductwork.

Referring back to FIG. 2, it is noted that the cost of air-pollution equipment may be further reduced by the employment of dirty gas to form curtain 38, supplied through primary duct 34a. In a typical instance, the flow provided is such that the primary curtain flow is between about 30 to 50 percent of the total inflow to the hood from all sources. The secondary flow of clean air, (curtain 35), which is effected at higher velocites, is directed to neutralize local drafts and shield the inner curtain so that it may perform in the most efficient manner.

In accordance with the present invention, the flow of the air curtain 38, and where utilized, curtain 35, is such as to control the influx of ambient air to the combustion zone 26 of the furnace as to establish and maintain selected conditions in the furnace and at the collection system connected to the hood output duct. In particular, the flow of ambient air is such that substantially complete combustion is maintained within zone 26, while at the same time, the solid particle collection system 33 is supplied with a sufficient quantity of thereby induced cool air so that the temperatures in said system do not exceed the design value for the particular installation. In a typical instance, for example, it was found that a furnace system similar to that shown in FIG. 1 provided an output at the associated filtering system of 300,000 CFM at a temperature of 350° F. By use of a controlling system based upon the air curtain set forth in the invention, the flow to the filter system was reduced to 210,000 CFM at a temperature of 530° F. Such a reduction in the flow output from the furnace enabled a substantial reduction in the size of the collection system, while at the same time, the temperatures indicated, had no detrimental effect upon the said collection system.

While the present invention has been particularly set forth in terms of specific embodiments thereof, it will be appreciated, in view of the instant disclosure, that numerous variations upon the invention are now enabled to those skilled in the art, which variations yet reside within the scope of the present teaching. Accordingly, the invention is to be broadly construed and limited only by the scope and spirit of the claims now appended hereto.

I claim:

1. An electric smelting furnace system comprising in combination
    a. an electric smelting furnace pot, open at the top end thereof;
    b. a hood above the furnace pot and spaced therefrom to provide unobstructed access to the top of the furnace pot for charging and/or stoking, and for admitting ambient air for oxidizing or ventilating furnace off-gases, said hood acting to collect the hot gaseous furnace products containing entrained solid particles and induced air derived from the atmosphere surrounding the furnace and admitted through the said unobstructed access;
    c. a solid particle collection system connected to receive the gaseous products collected by said hood, said collection system being of limited volumetric capacity for separating solid particles from the hot gaseous furnace products and induced air, prior to discharge of same into the atmosphere, said collection system being subject by its construction to certain temperature limits;
    d. means for projecting a continuous annular curtain of gas in a downwardly path partially across the unobstructed access area between said furnace pot and said hood, to thereby limit the volume of air induced from the atmosphere surrounding the furnace to an amount sufficient to provide substantially complete combustion of the oxidizable gaseous furnace products and reduce the temperature of the gases to be processed through said collection system, without exceeding the capacity of the collection system.

2. A smelting furnace system in accordance with claim 1, wherein said gas curtain projecting means is an annular duct mounted about the lower periphery of said hood and projects a continuous annular curtain of gas in a downwardly path toward the periphery of said furnace pot, and at flow rates and velocities below those effective to seal off said ambient atmosphere, whereby a controlled annular opening for entry of ambient gases remains above the said periphery of said pot.

3. A system according to claim 2 wherein said annular duct further comprises an inner duct and an outer duct wherein said inner duct is adapted to project a continuous annular curtain of dirty gases derived from ancillary operations associated with said furnace and said outer duct is adapted to project a continuous annular curtain of clean air.

4. In a method for operating an open electric smelting furnace having a furnace pot open at the top end thereof, including:
    a. locating a hood above said furnace pot;
    b. providing an unobstructed annular access area between said pot and said hood for charging, stoking, and for admitting ambient air for oxidizing and diluting furnace off-gases; and
    c. collecting the hot gaseous furnace products which contain entrained solid particles and induced air derived from the atmosphere surrounding the furnace and admitted through said access area in a solid particle collection system, said collection system being of limited volumetric capacity for collecting solid particles from the hot gaseous furnace products and induced air prior to discharge of same into the atmosphere; the improvement comprising:
    d. projecting a continuous annular curtain of gas in a downward path partially across the unobstructed access area between said furnace pot and said hood;
    e. regulating the volume of gas in said curtain so as to establish a flow pattern which controls the supply of air induced into the zone of combustion so that the temperature at said collection system and the volumetric flow into said collection system is maintained below pre-selected limits; and
    f. substantially combusting all of said gaseous furnace products in said smelting furnace.

5. A method in accordance with claim 4 wherein said curtain is projected downwardly between the peripheries of said hood and said pot, said flow pattern being such as to provide an annular unsealed zone above the periphery of said pot for controlled entry of said induced air.

6. A method in accordance with claim 4 wherein dirty gases derived from said furnaces are projected as at least a portion of said air curtain flow.

7. A method in accordance with claim 6 wherein said dirty gases are projected as the entirety of said curtain flow.

* * * * *